(12) United States Patent
Li et al.

(10) Patent No.: US 10,277,424 B2
(45) Date of Patent: Apr. 30, 2019

(54) UPLINK SOUNDING IN A WIRELESS LOCAL AREA NETWORK

(71) Applicant: Apple Inc., Cupertino, CA (US)

(72) Inventors: Guoqing Li, Campbell, CA (US); Joonsuk Kim, Saratoga, CA (US); Yong Liu, Campbell, CA (US); Christiaan A. Hartman, San Jose, CA (US); Su Khiong Yong, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 63 days.

(21) Appl. No.: 15/279,260

(22) Filed: Sep. 28, 2016

(65) Prior Publication Data

US 2017/0093600 A1    Mar. 30, 2017

Related U.S. Application Data

(60) Provisional application No. 62/234,620, filed on Sep. 29, 2015, provisional application No. 62/243,636, filed on Oct. 19, 2015.

(51) Int. Cl.
| | | |
|---|---|---|
| *H04L 25/02* | (2006.01) | |
| *H04L 5/00* | (2006.01) | |
| *H04W 84/12* | (2009.01) | |

(52) U.S. Cl.
CPC ........ *H04L 25/0224* (2013.01); *H04L 5/0037* (2013.01); *H04L 5/0048* (2013.01); *H04W 84/12* (2013.01)

(58) Field of Classification Search
CPC . H04L 2012/5608; H04L 84/12; H04L 88/08; H04L 80/04; H04L 88/06; H04L 84/18; H04L 74/08

USPC ..... 370/310.2, 328, 338, 349, 341, 348, 329
See application file for complete search history.

(56) References Cited

U.S. PATENT DOCUMENTS

| | | | | |
|---|---|---|---|---|
| 2005/0185679 | A1* | 8/2005 | Sangawa | H01P 1/2013 370/536 |
| 2015/0156794 | A1* | 6/2015 | Kwon | H04W 72/1231 370/329 |
| 2016/0295581 | A1* | 10/2016 | Ghosh | H04W 72/0446 |
| 2017/0111091 | A1* | 4/2017 | Cao | H04B 7/0452 |

OTHER PUBLICATIONS

Robert Stacey; Specification Framework for TGax; doc.: IEEE 802.11-15/0132r8; Sep. 22, 2015; 22 pgs.

* cited by examiner

*Primary Examiner* — Brenda H Pham
(74) *Attorney, Agent, or Firm* — Dickinson Wright RLLP (57) ABSTRACT

Time, frequency and waveform division multiplex schemes are used to efficiently estimate multiple uplink channels in a Wireless Local Area Network (WLAN). Orthogonal Frequency Division Multiple Access (OFDMA) and multi-user Multiple Input Multiple Output (MU-MIMO) approaches provide efficient uplink data transmission. An Access Point (AP) communicates with multiple Stations (STAs) in the WLAN. In some approaches, two or more STAs are addressed and the two or more STAs respond at the same time. The AP receives a composite signal and separates the responses to estimate the uplink channel from each STA. After the AP learns the uplink channels, the AP triggers data transmission from one or more of the WLAN STAs by sending a synchronizing trigger message. In some embodiments, the STAs respond simultaneously with data transmissions to the AP.

18 Claims, 10 Drawing Sheets

UPLINK SOUNDING IN A WIRELESS LOCAL AREA NETWORK

RELATED APPLICATIONS

This application claims benefit of U.S. Provisional Patent Application No. 62/234,620 "Uplink Sounding in a Wireless Local Area Network" filed on Sep. 29, 2015, and also claims benefit of U.S. Provisional Patent Application No. 62/243,636 "Uplink Sounding in a Wireless Local Area Network" filed on Oct. 19, 2015 (hereinafter "October Provisional"), both of which are hereby incorporated by reference herein. Two appendices are attached to the specification of the October Provisional, Appendices A and B. Appendices A and B of the October Provisional are hereby also incorporated by reference herein.

FIELD

The described embodiments relate to multiple access wireless communications using electronic devices, including techniques for estimating wireless channel characteristics between a first wireless station and an access point, and between a second wireless station and the access point. Methods for uplink transmission from the multiple stations based on the estimated channels are also described.

BACKGROUND

Wireless Local Area Networks (WLANs) support uplink and downlink transmission between multiple stations (STAs) and access points (APs). One modulation format used in WLANs is orthogonal frequency division modulation (OFDM). In some WLAN systems, some of the STAs and some of the APs each have multiple antennas. When STAs and APs have multiple antennas (allowing for multiple input—multiple output, or MIMO communication), multiple streams can be transmitted in a given direction at the same time in the same wireless frequency bandwidth. Because multiple users can be served in this way, one name for such a multiple access scheme is MU-MIMO. A second multiple access scheme is orthogonal frequency division multiple access (OFDMA). Problems arise in MU-MIMO and OFDMA when channel conditions are unknown at the entity receiving the MU-MIMO or OFDMA signals.

SUMMARY

Representative embodiments set forth herein disclose various systems and techniques for efficiently sounding uplink channels in wireless access systems and for efficiently transmitting and receiving uplink signals in such systems.

WLAN systems are made up of access points (APs) and stations (STAs). A given AP and a given STA may each have multiple antennas. The embodiments include sounding uplink channels in an efficient manner, conveying reporting information to two or more STAs in an efficient manner, efficiently triggering uplink transmissions from two or more STAs, and efficiently transmitting data from the two or more STAs.

Multiple access schemes can be based, for example, on time division, frequency division, and waveform division. In embodiments provided herein, these schemes are used to efficiently sound uplink channels.

An AP is described herein. The AP has two or more antennas, a transceiver coupled to the two or more antennas, one or more processors, wherein at least one processor of the one or more processors is coupled to the transceiver, and one or more memories coupled to the one or more processors. A memory of the one or more memories comprises instructions that when executed by the at least one processor cause the AP to perform steps comprising: i) transmitting an announcement message to first and second STAs, ii) receiving a first null data packet (NDP), wherein the first NDP was transmitted by the first STA at a first time, iii) receiving a second NDP, wherein the second NDP was transmitted by the second STA at a second time, and iv) transmitting a trigger frame to the first and second STAs. In some embodiments, the first and second NDPs are time multiplexed. In some embodiments, the first and second NDPs are frequency multiplexed by assigning different subcarriers to the first and second STAs using an OFDMA approach. In some embodiments, the first and second NDPs are waveform multiplexed.

When both a transmitter and a receiver have two or more antennas, multiple streams can be sent by the transmitter to the receiver. These streams can be separated at the receiver when channel state information is known between the transmit and receive antennas. Each transmitted stream, in some embodiments, corresponds to a particular transmit vector based on a decomposition of the joint channel matrix. In some embodiments, multiple streams are used to efficiently support uplink transmission.

In one multiple access scenario, there are multiple STAs in communication with an AP. In order to achieve MU-MIMO on the uplink, it is necessary to determine channel information between a set of transmitting STAs and the AP. In some embodiments, after this channel information is obtained, it is necessary to efficiently report to the set of STAs the transmit antenna weight vectors to use. There is one vector for each stream. The STAs then transmit the multiple streams and the AP receives a composite signal. The AP separates into the multiple streams from the composite signal and then demodulates each stream.

In one embodiment, the members of a transmitting set are a first STA and a second STA. Let the channel matrix from the first STA to the AP be the M×N matrix $H_1$, where the AP has M antennas and the first STA has N antennas. Similarly an M×N matrix $H_2$ represents the channel from the second STA to the AP.

In one direct transmission approach, the first STA transmits a modulation value vector $s_1$ and the second STA transmits a modulation value vector $s_2$ without any conditioning or weighting based on channel values and without the separately-assigned subcarriers of OFDMA. However, the AP may have difficulty recovering $s_1$ and $s_2$ in noisy conditions if this direct application of the modulation values to the transmit antennas is used. Incidentally, uplink channel sounding includes the first STA sending a predefined modulation value vector $s_1$ that is known to the AP. The channel rotates, attenuates, and delays the signal. The AP can estimate the rotation, attenuation and delay of the channel since it knows $s_1$ and when it was transmitted.

To obtain multiple received streams with good signal to noise ratio at the receiver, the AP, in some embodiments, will compute transmission parameters based on a decomposition of the joint channel matrix H. H can be estimated at the AP. The transmission parameters are sent to the STAs to transform or rotate transmission modulation values.

In order to obtain these multiple simultaneous uplink streams from multiple STAs, an estimate of the joint channel matrix H is obtained while reducing time/spectrum usage. The AP sends an NDP-A (null data packet announcement) message to one or more of the STAs that it is serving. This is directed to a single STA or to selected STAs or to all STAs attached to the AP. In embodiments described herein, efficiency is realized by receiving, by the AP, null data packets (NDPs, or sounding signals) at the same time and separating the NDPs which have passed from the STA antennas to the AP antennas by means of time, frequency, or another orthogonalization. In some embodiments, after the NDPs are received and analyzed, a transmission parameter report is sent to one or more of the STAs.

A transmission trigger packet or frame from the AP synchronizes and configures the set of transmitting STAs. In some embodiments, the transmission trigger packet is the report packet that carries the transmission parameters. In response to the transmission trigger packet, the first STA forms antenna-driving signals based on first received transmission parameters, the second STA forms antenna-driving signals based on second received transmission parameters, and the first and second STAs transmit the resulting signals at substantially the same time. The AP receives the transmissions through the joint channel matrix H and separates the streams as described above. The separate streams are then demodulated and decoded.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

WLAN systems are made up of APs and STAs. A given AP and a given STA may each have multiple antennas. Transmission from an AP to a STA is referred to as downlink transmission. The embodiments described herein provide for estimating channels from a group of STAs to an AP and uplink data transmission to the AP. The embodiments include sounding uplink channels in an efficient manner, conveying reporting information to two or more STAs in an efficient manner (in some embodiments), efficiently triggering uplink transmissions from two or more STAs, and/or efficiently transmitting data from the two or more STAs.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known between the transmit and receive antennas. Each transmitted stream corresponds to a particular transmit vector based on a decomposition of the joint channel matrix.

Downlink beamforming is a multiple-access approach that is particularly useful when an AP has downlink wireless channel information for two or more STAs. This is because the AP can point a first beam of radio energy bearing first information to a first STA while orienting a null or only very weak undesired transmission of the first information toward a second STA. The second STA views energy related to the first information as interference. Coincident with the AP transmission of the first information, the second STA receives a second beam bearing second information. Thus, the first and second STA are served at the same time, so the spectral efficiency in terms of bits per second per Hz is high when beamforming can be achieved. Beamforming requires two or more antennas at the AP. A given beam is formed by applying different antenna weights to an information-bearing signal and then driving the distinct transmit antennas with the distinct weighted wireless signals. The set of weights corresponding to the set of transmit antennas forms a transmit antenna weight vector. Beamforming approaches involving multiple transmission streams are described in IEEE 802.11n and in IEEE 802.11ac.

IEEE 802.11ac provides an arrangement for channel estimation of the multiple downlink channels from an AP to multiple STAs. The channel estimation involves a process called sounding. To perform sounding, an AP transmits a Null Data Packet-Announcement (NDP-A). The NDP-A contains the addresses of particular STAs to which the AP wishes to transmit data. The NDP-A is followed by a Null Data Packet (NDP). The NDP represents pilot energy; that is, a pre-defined pattern. Each STA addressed by the NDP-A measures the downlink wireless channel from the AP to itself. The channel measurement is possible because the given STA knows the pre-defined pattern and can estimate the effects of the channel on that pattern (for example, amplitude attenuation, carrier phase rotation, and time delay).

The various STAs feedback their channel measurements to the AP, and then the AP with multiple antennas can transmit multiple streams to the multiple STAs (each with multiple antennas) based on the received channel information.

In the downlink scenario, there is one NDP and all of the STAs can measure their respective channels based on the one NDP. However, it is desirable to have multiple STAs transmit multiple user data streams at the same time on multiple uplink channels. In this case, an AP needs to estimate multiple uplink channels. There is a need to efficiently send pilot signals from the multiple STAs on the uplink, and also a need to efficiently transmit data from the multiple STAs to the AP on the uplink.

In one multiple access scenario, there are multiple STAs in communication with an AP. The number of streams that can be simultaneously sent by the STAs and received by the AP is upper-bounded. The upper bound is limited as a minimum function based on: 1) a number of transmit antennas that each STA has and 2) the number of receive antennas at the AP.

In order to achieve MU-MIMO on the uplink, it is useful to determine channel information between a set of STAs which will transmit together to the AP. Let this set be referred to as the transmitting set of STAs. In some embodiments, to obtain multiple received streams with good signal to noise ratio at the receiver, the AP will compute transmission parameters based on a decomposition of the joint channel matrix H. H can be estimated at the AP. After this channel information, H, is obtained, it is necessary to efficiently report to the set of STAs transmission parameters. In some embodiments, the transmission parameters include transmit antenna weight vectors to use at each STA during data transmission. The transmission parameters are sent to the STAs to transform or rotate transmission modulation values. For example, using the transmission parameters, the received signal is $r=[H_1 \ H_2][C_1 s_1 ' C_2 s_2 ']+n$ where $C_1$ are the transmission parameters sent to the first AP and $C_2$ are the transmission parameters sent to the second AP. $s_1$ are $s_2$ are transmission modulation values based on first information and second information which the first STA and second STA are communicating to the AP. r is a composite signal. Let $J_1$ be the number of streams assigned to the first STA and $J_2$ be the number of streams assigned to the second STA. Then the dimensions of $C_1$ are $N \times J_1$ and the dimensions of $C_2$ are $N \times J_2$. This notation can be generalized to the case in which the first and second STAs have a different number of antennas.

There is one transmit antenna weight vector for each stream. Thus, an STA which is assigned two streams to transmit (e.g., $J_1=2$) will receive two transmit antenna weight vectors and an STA which is assigned one stream to transmit (e.g., $J_2=1$) will be assigned one transmit antenna weight vector. The transmitting set of STAs modulate their vectors with information streams and transmit simultaneously. The modulated vectors pass through the joint channel to the AP, resulting in a receive vector (each element in the vector sampled by the AP from one receive antenna). The AP applies a first receive weight vector to the receive vector and the resulting scalar is an estimate of a transmitted modulation value of the first stream. In embodiments, the scalar is the result of forming an inner product between the first receive weight vector and the receive vector. The AP then applies a second receive weight vector to the same receive vector and the resulting second scalar is an estimate of a transmitted modulation value of the second stream. This continues until an estimate is obtained for each stream. Alternatively, the receive vectors are rows of a matrix B, the receive vector is a column vector r and the estimated modulation values collectively form a column vector w, that is w=Br. The receive weight vectors are determined based on the joint channel information at the same time that the transmit weight antenna vectors are obtained. An estimate of a noise correlation matrix associated with the receive vector r may also be a factor in determining B. The matrix B operates on the vector r; r has one element for each receive antenna at the AP; thus r is an M×1 vector. The B matrix separates the $J_1+J_2$ streams arriving from the set of transmitting STAs. Thus w is a column vector of $J_1+J_2$ elements and B is a matrix with $J_1+J_2$ rows and M columns. The arithmetic here is generally complex with each matrix or vector element being a scalar and each scalar having a real and an imaginary part. The representations are at baseband. In a representation at the carrier frequency (pass band representation) the real part of a scalar would correspond to the in-phase component of a carrier wave and the imaginary part of the scalar would correspond to the quadrature-phase component of the carrier wave (so-called I and Q components). At baseband, the I and Q components remain without explicit representation of the carrier wave itself.

In one embodiment, the members of the transmitting set are the first STA and the second STA. Let the channel matrix from the first STA to the AP be the M×N matrix $H_1$, where the AP has M antennas and the first STA has N antennas. Similarly an M×N matrix $H_2$ represents the channel from the second STA to the AP. In general, the first STA and the second STA may have a different number of antennas.

In a direct transmission approach, if the first STA transmits a modulation value vector $s_1$ and the second STA transmits a modulation value column vector $s_2$. The elements of the $s_1$ vector are points in a Quadrature Amplitude Modulated (QAM) signal constellation. In embodiments, the constellation points are selected based on encoded bits arriving from a forward error correction encoder in the first STA. In embodiments, the $s_1$ vector is formed in a corresponding way the second STA. The AP will observe a vector $r=[H_1 \ H_2][s_1 ' s_2 ']+n$, where n is a noise vector and ' indicates complex conjugate transpose. In this notation the joint channel matrix is $H=[H_1 \ H_2]$. However, the AP may have difficulty recovering $s_1$ and $s_2$ in noisy conditions if this direct application of the information modulation values to the transmit antennas is used.

In order to obtain these multiple simultaneous uplink streams from multiple STAs using matrices such as $C_1$ and $C_2$, an estimate of the joint channel matrix H is obtained with as little time/spectrum usage as possible. The AP sends an NDP-A (null data packet announcement) message to one or more of the STAs that it is serving. This may be directed to a single STA or to selected STAs or to all STAs attached to the AP. In embodiments described herein, efficiency is realized by receiving, by the AP, null data packets (NDPs, or sounding signals) at the same time and separating the NDPs which have passed from the STA antennas to the AP antennas by means of time division, frequency division, or another scheme, such as waveform division. These approaches allow the AP receiver to isolate information corresponding to each STA from a composite signal received, sampled or observed at the AP receiver. In some embodiments, after the NDPs are received and analyzed, a transmission parameter report is sent to one or more of the STAs. Possibly a STA which was not required to send an NDP will nevertheless be addressed by the transmission report and instructed to use a new set of transmission parameters. The transmission report carries to the first STA an index or table lookup address to a predefined $C_1$ matrix to use or a compressed encoding of the matrix $C_1$ to use or high precision, for example 8 bit real scalar, values of the matrix $C_1$ itself. Correspondingly the transmission report carries to the second STA an indication of $C_2$.

A transmission trigger packet from the AP synchronizes the set of transmitting STAs. The transmission trigger packet may be the packet that carries the transmission parameters, or it may be a transmission parameter report sent subsequent to the transmission trigger packet. In response to the transmission trigger packet, the first STA forms antenna-driving signals based on the received transmission parameters $C_1$, the second STA forms antenna-driving signals based on the received transmission parameters $C_2$, and the first and second STA transmit the resulting signals at substantially the same time. The AP receives the transmissions through the joint channel matrix H and separates the streams as described above. The separate streams are then demodulated and decoded.

In some embodiments, the frequency of sending the NDP-As and the STAs that the NDP-As are addressed depends on the mobility of the STAs addressed. STAs which are moving or are in a channel which is changing due to moving scatterers will be required to send NDPs in a correspondingly frequent manner (for example, in some embodiments, ten NDP soundings per second) so that the AP can determine the proper transmission weights for the STAs in the transmitting set to use.

Particular aspects of the embodiments are now discussed with reference to the figures.

Communication System

Figure 1:
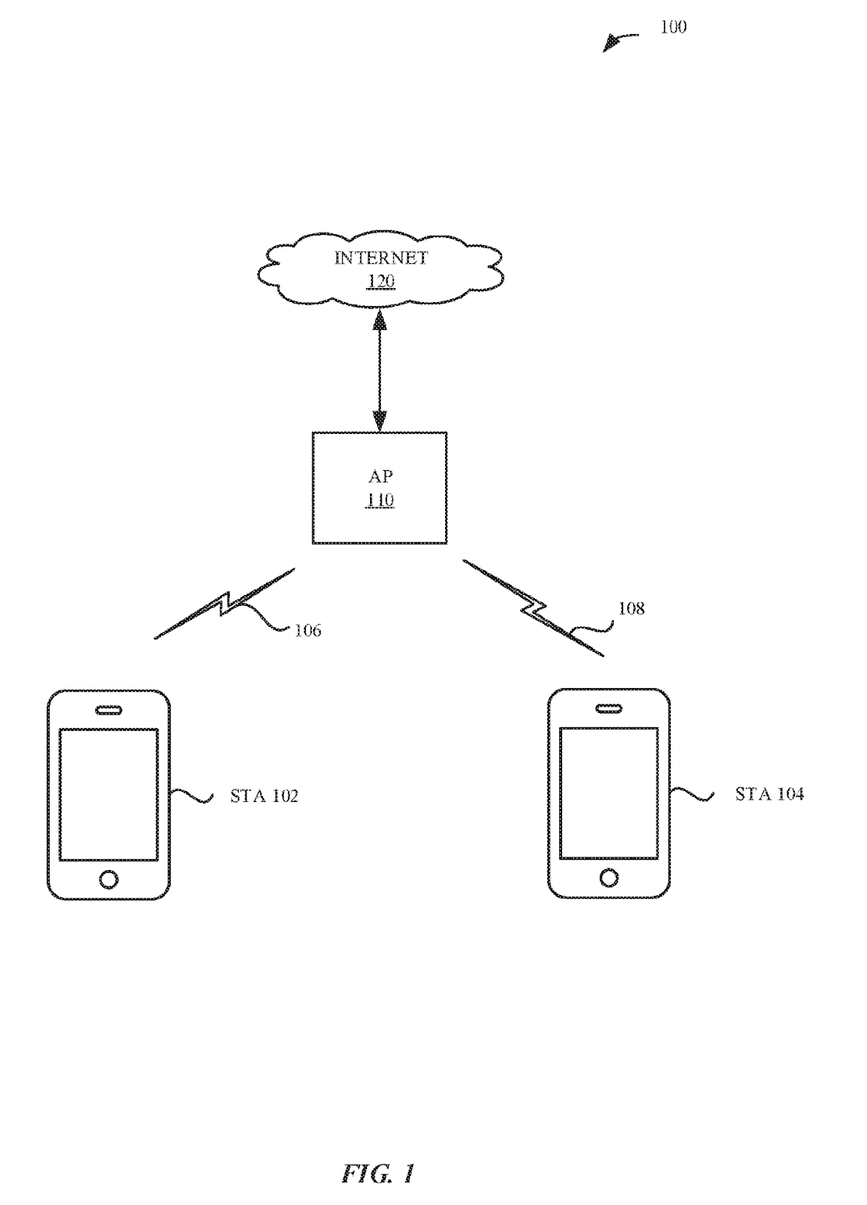
FIG. 1 illustrates an exemplary WLAN system including an Access Point (AP) and two WLAN Stations (STAs), according to some embodiments.

FIG. 1 illustrates an exemplary WLAN system including STA 102, STA 104, AP 110, and Internet 120. The wireless connection between STA 102 and AP 110 is indicated as link 106 (and similarly STA 104 with AP 110 as link 108). The direction or sense of these connections is described as follows. Transmission from AP 110 to the STAs is downlink transmission. Transmission from either STA to AP 110 is called uplink transmission. Generally uplink and down link transmission use different frequency bands. Thus the channel response on the downlink from AP 110 to STA 102, for example, is different than the channel response on the uplink from STA 102 to AP 110. In some embodiments described herein, AP 110 learns the uplink channel response, $H_1$, associated with link 106 by asking STA 102 to send a pilot or sounding or null data packet (NDP) signal on the uplink. AP 110 then samples the NDP arriving from STA 102. Because AP 110 knows the NDP waveform sent by STA 102, it can estimate the channel $H_1$, for example, using a correlation function. An OFDM system uses a plurality of subcarriers; let the number of subcarriers in an OFDM symbol be L. Generally $H_1$ is an L-vector formed of L complex scalars, each scalar representing a channel gain at the corresponding subcarrier. For delay spread and subcarrier spacings of interest, $H_1$ changes slowly from element to element, and it is not necessary to perform a measurement at each subcarrier. For example, measurements can be made at subcarriers indexed with an even index value, and the values of $H_1$ corresponding to the odd indices can be estimated by interpolating between the values of $H_1$ at the even indices. AP 110 also learns the uplink channel response, $H_2$, associated with link 108 by asking STA 104 to send an NDP data packet as described further below.

Uplink Sounding, Time Sequence

Figure 2:
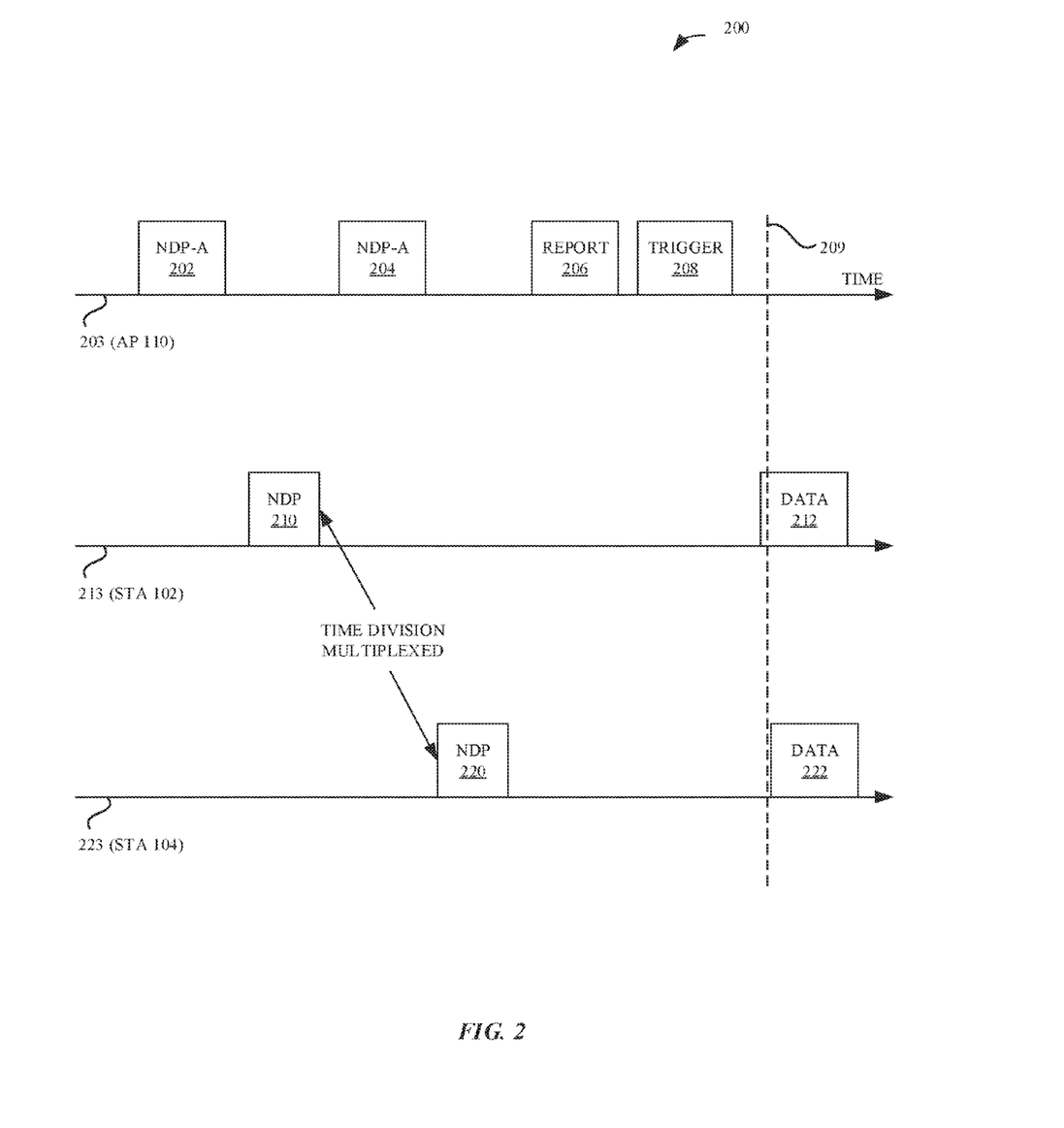
FIG. 2 illustrates an exemplary time division method of obtaining uplink channel information corresponding to the two STAs, according to some embodiments.

FIG. 2 illustrates an exemplary series of transmissions that are used in embodiments herein to estimate the channels $H_1$ and $H_2$. Three timelines (203, 213, and 223) are shown in FIG. 2, one for each of AP 110, STA 102 and STA 104 (indicated in parentheses in FIG. 1). The three timelines illustrate transmitted signals; not shown are corresponding received versions of the transmitted signals. In FIG. 2, uplink sounding is carried out in a time sequence. The first event occurs on timeline 203. AP 110 sends a Null Data Packet-Announcement (NDP-A) 202 addressed to STA 102. STA 102 receives NDP-A 202 and responds by transmitting NDP 210. AP 110 estimates $H_1$ based on sampling NDP 210 as received. AP 110 then transmits NDP-A 204 addressed to STA 104 and STA 104 responds with NDP 220. AP 110 estimates $H_2$ based on sampling NDP 220 as received.

AP 110 may be supporting simultaneous multiuser uplink transmission by using either the multi-stream MIMO techniques described above or Orthogonal Frequency Division Multiple Access (OFDMA). In some embodiments, AP 110 calculates transmission parameters for the multi-stream MIMO technique and sends these parameters to STA 102 and STA 104 in Report 206. In some embodiments using OFDMA, AP 110 calculates multi-user OFDMA parameters and sends these parameters using Report 206. Both STA 102 and STA 104 receive report 206. AP 110 then sends Trigger 208, which schedules, at the time 209 indicated by a vertical dashed line in FIG. 2, the simultaneous uplink transmission of STA 102 and STA 104. STA 102 and STA 104 transmit at time 209. AP 110 receives a composite signal based on the uplink channels, the transmission parameters used by the STAs and the uplink data transmitted.

In a practical system, there is some uncertainty as to transmission time due, at least, to time of flight from STA 102 to AP 110, time of flight from STA 104 to AP 110, and due to differences in time base clocks used to calculate the occurrence of time 209. This uncertainty is indicated in FIG. 2 by the variation in leading edge of the data packet Data 212 sent by STA 102 on timeline 213 versus time 209 (and similarly for DATA 222 on timeline 223). In some embodiments, AP 110 accounts for this variation in transmission time when demodulating the received signals.

AP 110 then separates the received transmissions and performs demodulation and decoding of the uplink data sent from each STA. In embodiments the information of packets Report 206 and Trigger 208 may be sent in a variety of ways. For example, the report information may be sent in two report packets, one for each of STA 102 and STA 104. In some embodiments, the information of Report 206 and Trigger 208 may be sent in a single packet.

Uplink Sounding, Frequency Domain

Figure 3:
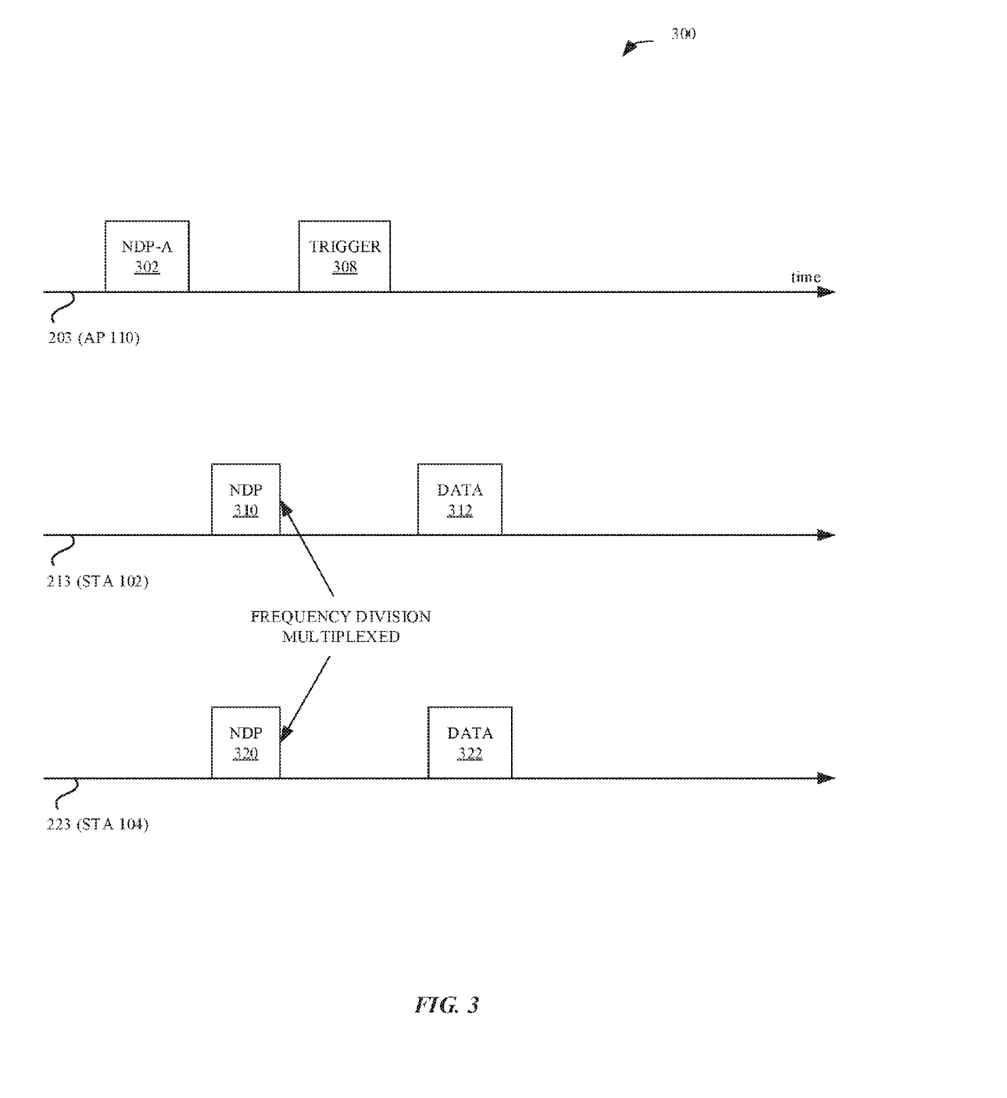
FIG. 3 illustrates an exemplary frequency division method of obtaining uplink channel information corresponding to the two STAs, according to some embodiments.

In some embodiments, STA 102 and STA 104 simultaneously transmit NDPs. The simultaneous transmission is indicated in FIG. 3 as NDP 310 and NDP 320. The receiver of AP 110 is able to separate the responses to these null data packets because of the structure of the transmissions. In some embodiments, NDP 310 is based on a first set of predefined carriers, where the first set is indicated by NDP-A 302. In an embodiment the first set is made up of subcarriers with even-numbered indices. NDP 320 is based on a second set of predefined carriers, where the second set is indicated by NDP-A 302. In an embodiment the second set is made up of subcarriers with odd-numbered indices. Thus, exemplary simultaneous transmissions are frequency division multiplexed, as indicated in FIG. 3.

In some embodiments, NDP 310 is based on an OFDMA Resource Unit (RU) allocation. In an OFDMA frame structure, each subcarrier is modulated with a number of OFDM symbols. During the frame, each OFDM symbol is identified as an RU. On a given subcarrier during a given frame, some RUs may be devoted to pilot energy and other RUs may be provided with no pilot energy. The collection of RUs over all the subcarriers is represented by a time/subcarrier map. In some embodiments, NDP-A 302 instructs STA 102 to energize particular ones of the RUs of the map with pilot energy. This is an OFDMA RU allocation. NDP-A indicates a different OFDMA RU allocation to be used by STA 104. In some embodiments, the intersection of pilot energy locations of the NDP 310 map and the NDP 320 map shows no common subcarriers in use at the same OFDM symbol time. Thus NDP 310 and NDP 320 are frequency division and time division multiplexed at the RU level in some embodiments. AP 110 estimates the channels $H_1$ and $H_2$ based on a composite received signal. The composite received signal is based on H1, H2, NDP 310 and NDP 320. Trigger 308 includes multi-user transmit parameters and schedules the transmission of data in the frequency domain. In some embodiments, AP 110 jointly determines the OFDMA RU allocation for Data 312 and Data 322 based on the composite received signal and conveys the OFDMA RU allocation for each STA in Trigger 308. In response to Trigger 308, STA 102 and STA 104 send Data 312 and Data 322, respectively.

Uplink Sounding, Based on Waveform

Figure 4:
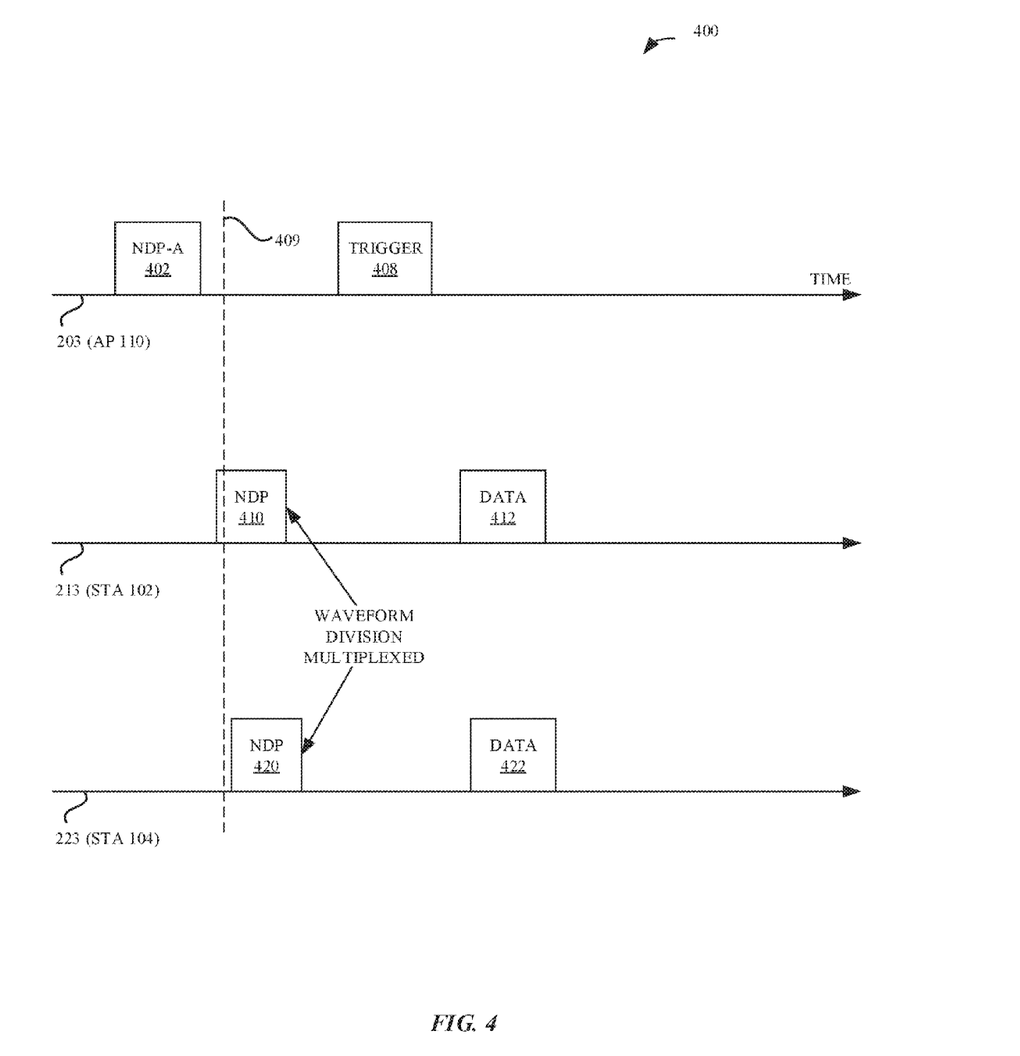
FIG. 4 illustrates an exemplary waveform-based method of obtaining uplink channel information corresponding to the two STAs, according to some embodiments.

In FIG. 4, exemplary embodiments are illustrated in which NDP-A 402 instructs STA 102 and STA 104 to use NDPs which are separated based on waveform. With this approach, each STA transmits on all subcarriers. The IEEE 802.11ax standard defines a P matrix. In some embodiments the columns or rows of the P matrix are used to provide the subcarrier weights for the waveform approach. The row or column to be used in NDP 410 is indicated in NDP-A 402. The row or column to be used in NDP 420 is indicated in NDP-A 402. STA 102 and STA 104 respond at schedule time 409 by sending NDP 410 and NDP 420, respectively. The receiver of AP 110 observes a composite signal based on $H_1$, $H_2$, NDP 410, and NDP 420. In general, there will be some time uncertainty around scheduled time 409 similar to that discussed with regard to time 209 of FIG. 2. In embodiments, AP 110 accounts for this time uncertainty in estimating the channels $H_1$ and $H_2$. In other embodiments, the dimensional scale of the WLAN system 100 shown in FIG. 1 in terms of geographic distance is such that any time uncertainty around the scheduled transmission time is negligible and so it is neglected by the receiver of AP 110 without loss of performance. After estimating the channels, AP 110 sends Trigger 408 which includes multi-user transmission parameters. STA 102 and STA 104 then, responsive to the scheduled transmission time explicitly or implicitly signaled by Trigger 408 and based the multi-user transmission parameters, coincidentally send Data 412 and Data 414, respectively.

Report Packet, Multiple Simultaneous Uplink Streams

Figure 5:
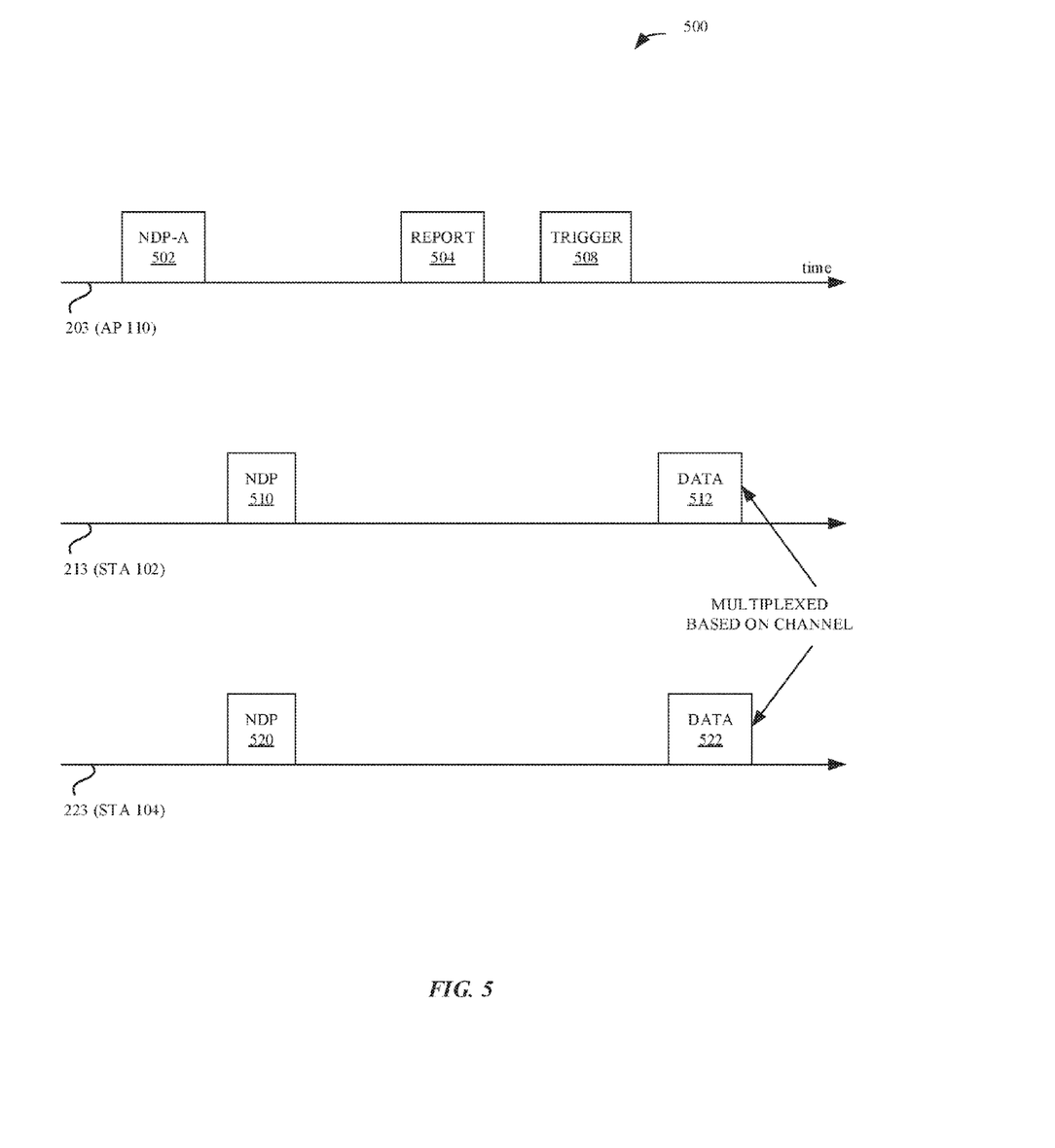
FIG. 5 illustrates an exemplary method of supporting simultaneous uplink transmission from the two STAs, according to some embodiments.

In some embodiments, AP 110 determines that a set of STAs will use coincident transmission of uplink streams. AP 110 obtains channel soundings to estimate $H_1$ and $H_2$ using one of the methods described in FIGS. 2-4 (time, frequency or waveform methods). In some embodiments, AP 110 then calculates $C_1$ and $C_2$ matrices. AP 110 uses Report 504 to communicate or indicate the values of the matrices $C_1$ and $C_2$ to STA 102 and STA 104 for use in data transmission. FIG. 5 shows an exemplary communication as a single packet, Report 504, multicast to the STA 102 and STA 104. In some embodiments, the $C_1$ matrix information is separately indicated or communicated by a unicast message addressed to only STA 102, and the $C_2$ matrix information is separately indicated or communicated by a unicast message addressed to only STA 104. Report 504 may be referred to as a beamforming report.

Logic Flows

Figure 6:
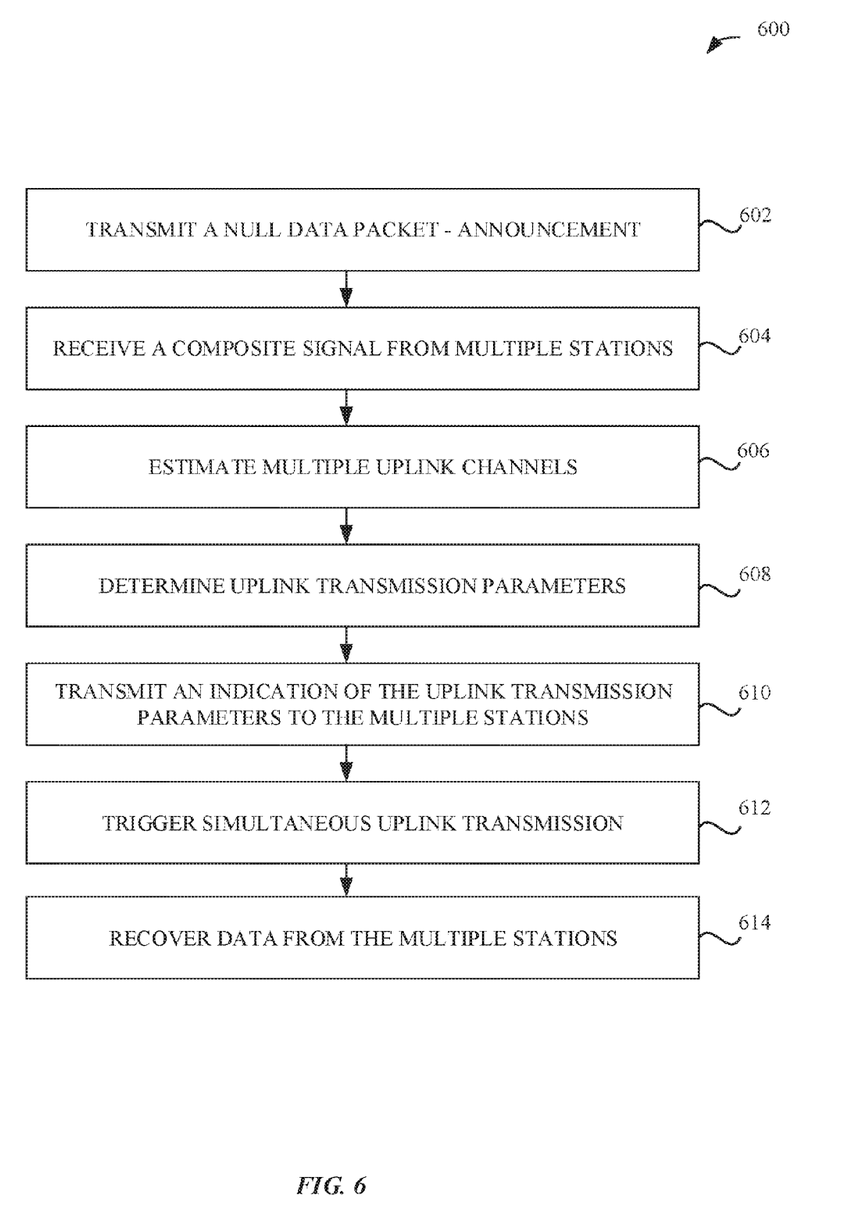
FIG. 6 illustrates exemplary logic for an AP in an exemplary embodiment.

FIG. 6 illustrates exemplary logic implemented by an exemplary AP. At 602, the AP transmits an NDP-A to a set of STAs. The STAs respond to the NDP-A. The NDP from each STA passes through an uplink channel. At 604, the AP receives a composite signal based on the multiple NDPs passing through the multiple uplink channels, and, at 606, the AP estimates the multiple uplink channels based on the received composite signal. At 608, the AP determines uplink transmission parameters including a number of uplink streams supported by the multiple uplink channels and transmission parameters to be used by the multiple STAs. For OFDMA, the uplink transmission parameters comprise subcarrier assignments to be used by a particular STA. At 610, the AP transmits the number of uplink streams each STA is to send (in some embodiments) and an indication of the transmission parameters each STA is to use for multiple-antenna transmission. Possibly some STAs receive a message indicating no transmission is allocated to them for the next data transmission event. The AP then triggers, at 612, simultaneous uplink transmission by those STAs assigned uplink streams. The AP receives a composite signal based on the uplink streams, the transmission parameters, and the multiple uplink channels; at 614, the AP recovers the information from the multiple uplink streams.

Figure 7:
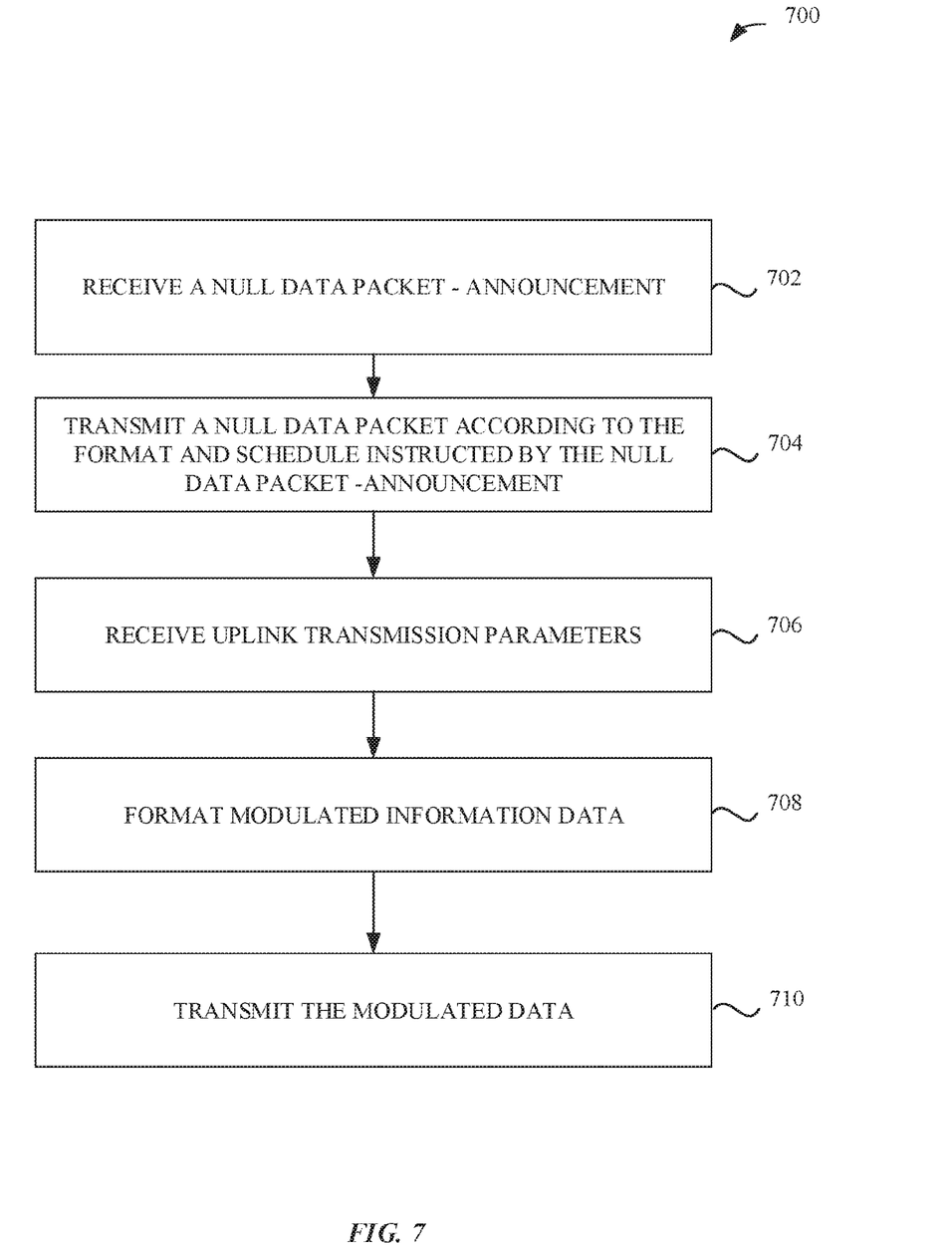
FIG. 7 illustrates exemplary logic for a STA in an exemplary embodiment.

FIG. 7 illustrates exemplary logic implemented by an exemplary STA. At 702, the STA receives, from an AP, an NDP-A. At 704, the STA transmits an NDP according to the multiplexing format and schedule instructed by the NDP-A. At 706 the STA receives uplink transmission parameters and, in some embodiments, an assignment of a number of streams to send. At 708, the STA formats data for transmission and applies modulation. At 710, the STA transmits the modulated data.

Frequency Sampling, Uplink Allocation Format

Figure 8:
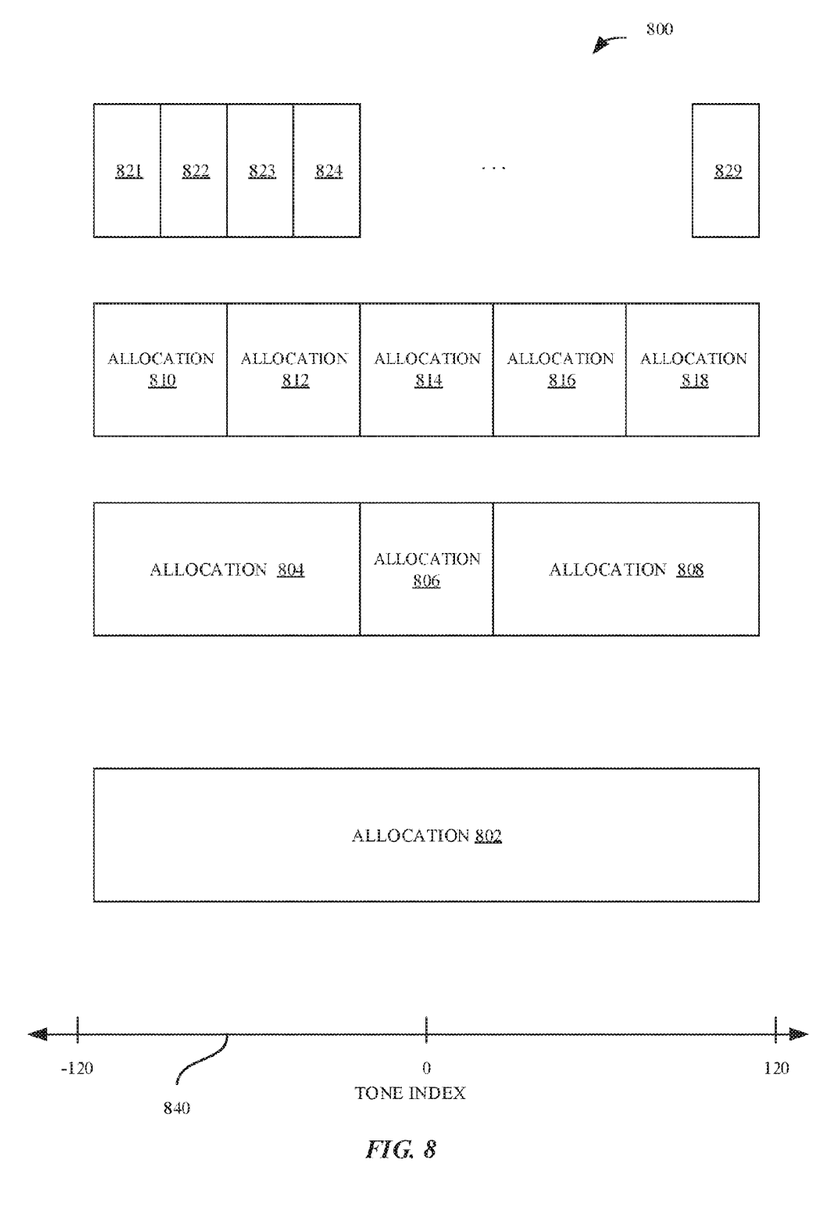
FIG. 8 illustrates exemplary Resource Unit (RU) allocations to STAs, according to some embodiments.

FIG. 8 illustrates four possible allocations in an OFDMA scheme. The available bandwidth is 20 MHz. Each STA which is provided with an uplink transmission grant is given one or more Resource Units (RUs) on which to transmit. The duration of the subsequent data transmission from a STA will be for one PPDU (Phy Protocol Data Unit), that is, one packet interval. An example PPDU is Data 312. An RU, in an exemplary embodiment, represents 26 contiguous tones or subcarriers. For example, STA 102 of FIG. 1 may be provided with Allocation 802, which represents the entire 20 MHz band. In some embodiments, tone index 0 is not included in the allocations discussed herein. In some embodiments, STA 102 is provided allocation 804, a STA 103 (not shown) is provided allocation 806 (possibly excepting tone 0) and STA 104 of FIG. 1 is provided allocation 808. In some embodiments, STA 102 is provided with Allocation 804 and STA 104 is provided with allocations 806 and allocation 808. The allocations to a particular STA need not be contiguous in frequency. In another instance, allocations 810, 812, 814, 816, and 818 are assigned to one, two, three, four or five STAs.

FIG. 8 illustrates allocations 821 . . . 829 representing nine twenty-six-tone RUs in a 20 MHz system bandwidth. In some embodiments, AP 110 may address nine STAs with a goal of possibly assigning, for uplink data transmission, Allocation 821 to one of the set of nine STAs, allocation 822 to a second of the set of nine STAs, and so on such that Allocation 829 is assigned to a ninth STA of the set of nine STAs. Each STA may have a best uplink channel response frequency interval for communication with the AP. In order to learn which RU (frequency interval) to assign to which STA, the AP commands each STA to send one or more tones in an NDP in response to NDP-A 302. In FIG. 3, only STA 102 and STA 104 are shown responding, but in an exemplary embodiment, more than two STAs can transmit responsive NDPs, for example, nine. The STAs respond, in an exemplary embodiment, to an NDP-A with an NDP after a short interframe space (SIFS). The STAs also respond, for example, to a trigger such as Trigger 308, with a PPDU after an SIFS time interval.

In another embodiment, a system bandwidth of 40 MHz is available for uplink transmission corresponding to eighteen twenty-six-tone RUs. In a 40 MHz bandwidth, the AP can request that eighteen STAs respond with NDPs in order that the AP may determine 18 allocations.

Some STAs which respond may not be provided with allocations. Also, a single STA may be assigned more than one RU to use in the PPDU. If two tones are assigned per STA per allocation, then Ng=13 STAs can simultaneously transmit NDPs and probe all available allocations. The number of tones out of each exemplary twenty-six-tone RU and tone position for sounding can be indicated in an NDP-A (for example, NDP-A 310 of FIG. 3). In some embodiments, a single STA is addressed. For example, in FIG. 2, NDP-A 202 is addressed to STA 102 which responds with NDP 210.

Figure 9:
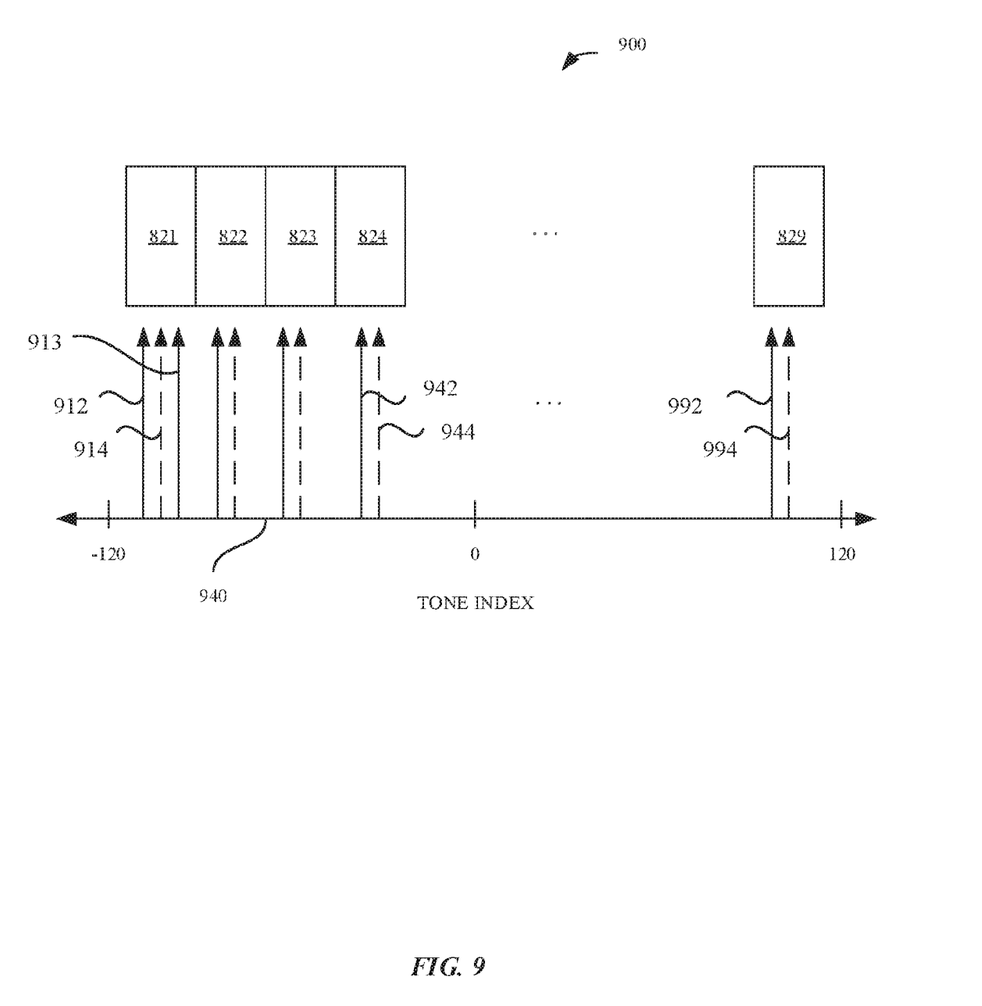
FIG. 9 illustrates exemplary sampling of uplink channel responses using uplink sounding tones, according to some embodiments.

FIG. 9 illustrates a tone 912 assigned to be used by STA 102 in NDP 310. FIG. 9 also illustrates a tone 914 (shown with a dashed arrow) to be used by STA 104 in NDP 320. As shown, tone 912 and tone 914 will provide AP 110 with information about allocation 821. In some embodiments, a STA may be assigned more than one tone to use to evaluate a single RU. For example, as shown in FIG. 9, STA 102 may be assigned both tone 912 and tone 913 to be used in NDP 310. Similarly, STA 104 may be assigned more than one tone to use to probe allocation 821. Further tones beyond tone 913 may be assigned to probe RU 821 but are not shown in FIG. 9. The assignment of tone 912 to STA 102 can be done using an index. For example, tone 912, . . . , tone 942, . . . , and tone 992 may be assigned to STA 102 with an index value of 0. Tone 914, . . . , tone 944, . . . , and tone 994 may be assigned to STA 102 with an index value of 1. Index values of 0, 1, . . . , 125 can be used to refer to a tone position within a twenty-six tone RU. Alternatively, the assignment may provide an offset and an interval. For example, to assign two tones per RU, the assignment can give the position of the first tone, and the distance to the next tone in the subset of tones to be used by the STA which is addressed. For example, the first and thirteenth tone can be assigned with an offset of zero and an interval of twelve. For arranging downlink transmission, the AP may be letting the STAs know that a downlink NDP will be coming. Thus the NDP-A can include a field to indicate direction. That is, the NDP-A can include a field which indicates either uplink (UL) or downlink (DL).

The AP, in some embodiments, computes the signal to noise ratio (SNR) for each received tone. For MIMO systems, the AP can calculate the SNR for each receive path based on orthogonal sequences sent by each STA using rows of the assigned P matrix. The P matrix is discussed above with regard to FIG. 4. Each STA with more than one antenna can be assigned a distinct row of the P matrix to be used in an NDP. The AP can separate the channel responses on a per-antenna, per-STA basis based on the assigned P matrix rows. The AP 110 can assign to STA 102 those allocations (groups of subcarriers corresponding to one or more RUs) for which NDP 310 produced high SNR values. Similarly, one or more allocations can be assigned to STA 104 for which NDP 320 provided high SNR values.

The allocations which the AP 110 determines are then sent to the STAs using a trigger such as Trigger 208, Trigger 308 or Trigger 408. In an exemplary embodiment, the addressed STAs respond according to their assignment, an SIFS interval after the trigger. In some embodiments, the STAs respond commensurate with a beginning of a next packet (PPDU) interval.

Thus, NDP-A 302 of FIG. 3 can be configured to address a set of STAs. The number of STAs in the set is Ng (number in the group, or group number, for example, Ng=nine). In another example, NDP-A 302 can address STA 102, STA 103 and STA 104. For each STA in the set, the AP 110 provides configuration information indicating pilot tones to be used by a particular STA in a responsive NDP. For example, in FIG. 3, AP 110 sends NDP-A 302 and informs STA 102 of tones to be used in the response NDP 310. Similarly AP 110 uses NDP-A 302 to inform STA 104 of other tones to be use in the response NDP 320.

Generally, AP 110 can assign up to twenty-six tones per twenty-six-tone RU in an NDP. FIG. 9 shows exemplary tones 942 and 944 assigned to STA 102 and STA 104, respectively, to probe allocation 824. These assignments can continue for all of the tone indices (possibly excepting tone 0) up to exemplary tones 992 and 994 assigned to STA 102 and STA 104, respectively, to probe allocation 829.

After the addressed STAs receive tone assignments in NDP-A 302, they respond with NDPs. For example STAs 102 and 104 respond with NDP 310 and NDP 320, respectively and other simultaneous NDPs can be sent from other STAs, not shown. When more than one STA is assigned to respond with a PPDU, the resulting transmission from a STA can be referred to as a Multi-User Phy Protocol Data Unit (MU PPDU).

Representative Exemplary Apparatus

Figure 10:
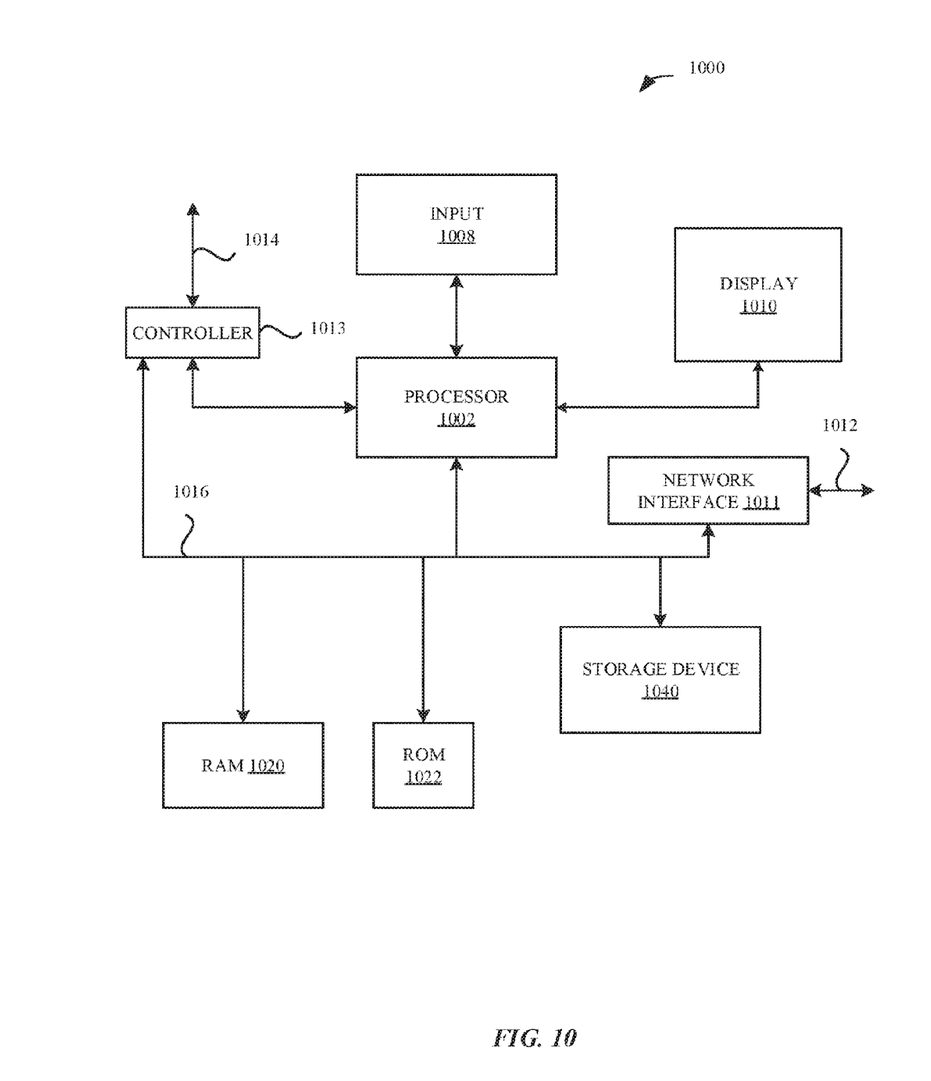
FIG. 10 illustrates an exemplary apparatus for implementation of the embodiments disclosed herein.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the STA 101, STA 104 and/or AP 110 illustrated in FIG. 1. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000.

Radio Access Technologies

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Method of Uplink Transmission Based on Transmission Parameters

Provided herein is a method of efficiently assigning transmission parameters, the method comprising: by a base station: transmitting a first reporting message comprising first transmission parameters to a first wireless device; transmitting a second reporting message comprising second transmission parameters to a second wireless device; and transmitting a trigger frame to the first and second devices. In some embodiments, the method includes receiving a first data stream from a first wireless device and a second stream from a second wireless device, and the method includes, by the base station: transmitting, to first and second wireless devices, a null data packet announcement message (NDP-A); receiving a first null data packet (NDP) from the first wireless device; and receiving a second NDP from the second wireless device. In some embodiments, the NDP-A provides a first index to the first wireless device, wherein the index indicates a row or column of a transmission matrix to be used by the first wireless device in forming the first NDP. In some embodiments, the NDP-A provides a description of the NDP to be used by the first wireless device. In some embodiments, the columns or rows of the transmission matrix comprise an orthogonal set. In some embodiments, the first NDP is based on a first set of subcarriers and the second NDP is based on a second set of subcarriers and the first and second set are mutually exclusive. In some embodiments, the method includes computing a joint channel estimate matrix based on the first received NDP and the second received NDP; computing a decomposition of the joint channel estimate matrix; identifying first, second, and third component vectors from the computed decomposition; assigning the first and second component vectors to the first wireless device; assigning the third component vector to the second wireless device; receiving, from the first wireless device a first data stream based on the first component vector; receiving, from the first wireless device a second data stream based on the second component vector; and receiving, from the second wireless device a third data stream based on the third component vector. In some embodiments, the first, second, and third data streams are received at substantially the same time.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of efficiently characterizing a plurality of wireless channels, the method comprising:
   by a base station:
   transmitting an announcement message to: i) a first wireless device, and ii) a second wireless device;
   receiving a first null data packet (NDP) from the first wireless device;
   receiving a second NDP from the second wireless device;
   determining resource assignments for the first wireless device and the second wireless device based at least in part on the received first NDP and second NDP; and
   signaling, in a trigger frame, the resource assignments to the first and second wireless devices,
   wherein:
   i) the first wireless device transmits the first NDP at a first time,
   ii) the second wireless device transmits the second NDP at a second time, and
   iii) the first NDP at least partially overlaps the second NDP in time.

2. The method of claim 1, wherein the announcement message comprises first tone index positions assigned to the first wireless device and second tone index positions assigned to the second wireless device.

3. The method of claim 1, wherein:
   i) the base station is a Wi-Fi access point,
   ii) the first wireless device is a Wi-Fi station,
   iii) the second wireless device is a Wi-Fi station, and
   iv) Wi-Fi is a commercial realization of an Institute of Electronic and Electrical Engineers 802.11 standard.

4. The method of claim 1, wherein the first NDP and the second NDP are frequency multiplexed.

5. The method of claim 1, wherein the first NDP and the second NDP are waveform multiplexed.

6. The method of claim 1, further comprising:
   by the base station:
   transmitting the trigger frame to the first wireless device and the second wireless device after receipt of the first NDP from the first wireless device and the second NDP from the second wireless device,
   wherein: i) the resource assignments comprise schedule values and ii) the schedule values: a) indicate to the first wireless device a first time to transmit first data to the base station, and b) indicate to the second wireless device the first time to transmit second data to the base station.

7. The method of claim 6, wherein: i) the trigger frame is transmitted ending at a first time value, and ii) the first time value indicates to the first wireless device a start time for an uplink transmission.

8. The method of claim 6, further comprising:
   receiving a first data transmission from the first wireless device at a first reception time to produce first received data; and
   receiving a second data transmission from the second wireless device at a second reception time to produce second received data.

9. The method of claim 8, wherein a magnitude of a difference between the first reception time and the second reception time is less than a system frequency bandwidth.

10. The method of claim 6, further comprising:
before transmitting the trigger frame:
transmitting a report message to the first wireless device and the second wireless device, wherein the report message comprises transmission parameters.

11. The method of claim 10, wherein: i) a first data transmission from the first wireless device and a second data transmission from the second wireless device are multiplexed according to an orthogonal frequency division multiple access (OFDMA) format, ii) the transmission parameters indicate a selected plurality of subcarriers, and iii) the first data transmission is over the selected plurality of subcarriers.

12. The method of claim 10, further comprising:
receiving, from the first wireless device, a first data transmission, wherein the first data transmission is based on a multi-user multiple input multiple output (MU-MIMO) technique.

13. An access point (AP) comprising:
two or more antennas;
a transceiver coupled to the two or more antennas;
one or more processors, wherein at least one processor of the one or more processors is coupled to the transceiver; and
one or more memories coupled to the one or more processors, wherein a memory of the one or more memories comprises instructions that when executed by the at least one processor cause the AP to perform steps comprising:
transmitting an announcement message to: i) a first wireless device, and ii) a second wireless device,
receiving a first null data packet (NDP) to produce a first received NDP, wherein the first NDP was transmitted by the first wireless device at a first time,
receiving a second NDP to produce a second received NDP, wherein the second NDP was transmitted by the second wireless device at a second time,
determining resource assignments for the first wireless device and the second wireless device based at least in part on the received first NDP and second NDP, and
transmitting a trigger frame to the first and second wireless devices, the trigger frame comprising the resource assignments,
wherein the first NDP at least partially overlaps the second NDP in time.

14. The AP of claim 13, wherein the first and second NDPs are frequency multiplexed.

15. The AP of claim 13, wherein the first and second NDPs are waveform multiplexed.

16. The AP of claim 13, wherein:
the determining the resource assignments for the first wireless device and the second wireless device comprises:
calculating a first set of signal to noise ratio (SNR) values based on the first received NDP;
calculating a second set of SNR values based on the second received NDP;
assigning a first Resource Unit (RU) to the first wireless device based on the first set of SNR values;
assigning a second RU to the second wireless device based on the second set of SNR values; and
the resource assignments comprise the first and second RU assignments, and
the announcement message comprises first tone index positions assigned to the first wireless device and second tone index positions assigned to the second wireless device.

17. The AP of claim 13, wherein the steps further comprise:
receiving, responsive to transmitting the trigger frame, a first data transmission from the first wireless device; and
receiving, responsive to transmitting the trigger frame, a second data transmission from the second wireless device.

18. The AP of claim 17,
transmitting a single reporting message to the first and second wireless devices,
wherein: i) the single reporting message comprises first transmission parameters, ii) the first data transmission and the second data transmission are multiplexed according to an orthogonal frequency division multiple access (OFDMA) format, iii) the first transmission parameters indicate a selected plurality of subcarriers, and iv) the first data transmission is received by the AP over the selected plurality of subcarriers.

* * * * *